No. 778,495. PATENTED DEC. 27, 1904.
A. H. MARKS.
PNEUMATIC TIRE OR OTHER FLEXIBLE TUBULAR ARTICLE.
APPLICATION FILED MAY 3, 1904.

WITNESSES:
INVENTOR
Arthur H. Marks
BY
Attorneys.

No. 778,495.                                              Patented December 27, 1904.

UNITED STATES PATENT OFFICE.

ARTHUR H. MARKS, OF AKRON, OHIO.

PNEUMATIC TIRE OR OTHER FLEXIBLE TUBULAR ARTICLE.

SPECIFICATION forming part of Letters Patent No. 778,495, dated December 27, 1904.

Application filed May 3, 1904. Serial No. 206,146.

*To all whom it may concern:*

Be it known that I, ARTHUR H. MARKS, a citizen of the United States, residing at Akron, in the county of Summit and State of Ohio, have invented new and useful Improvements in Pneumatic Tires or other Tubular Flexible Articles, of which the following is a specification.

This invention relates to improvements in pneumatic tires, tire-covers, and other tubular flexible articles designed to withstand internal pressure; and the object is to so construct such articles that they will be less liable to burst under pressure.

With the above object in view the invention consists in the novel features of construction hereinafter fully described, particularly pointed out in the claims, and clearly illustrated by the accompanying drawings, in which—

Figure 1:
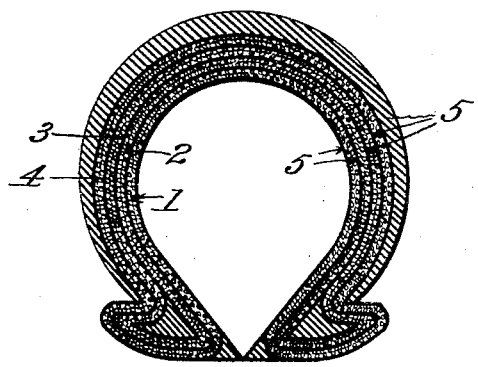
Figure 2:
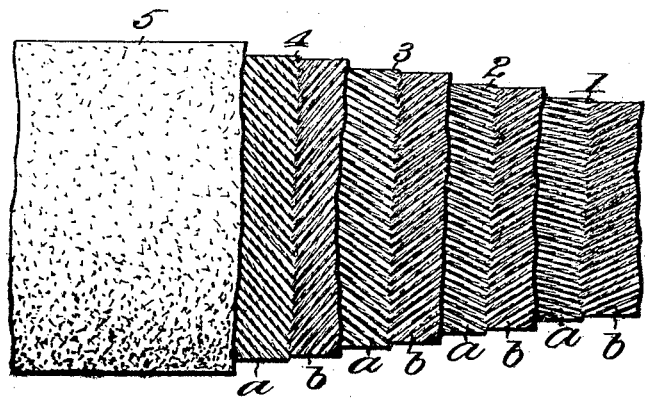

Figure 1 is a transverse sectional view of a tire-cover constructed in accordance with my invention, and Fig. 2 a plan view showing the successive layers of thread of which the tire is composed.

In my application for Letters Patent filed September 9, 1904, Serial No. 223,846, I have disclosed and claimed, broadly, means for increasing the life of a tire or other tubular flexible article designed to withstand internal pressure by rendering it less liable to burst under pressure, the invention consisting, broadly, in providing layers of fabric or other material having varying degrees of elasticity, so that all of the layers when in position will have the same limit of elasticity regardless of the difference in the areas of the several layers, whereby the structure will stretch uniformly. The present invention contemplates the carrying out of this broad idea by the particular construction described hereinafter.

While I have shown and described a tire-cover constructed in accordance with my invention, said invention is not limited to such application, as it can be employed in the construction of tire, hose, &c.

As shown in the drawings, my improved tire-cover is formed of alternate layers of thread and rubber. The layers 1, 2, 3, and 4 of thread consist each of two plies *a* and *b* of thread, one arranged upon the other, as shown clearly in Fig. 2, the upper layer crossing the lower layer or ply at an angle. These layers 1, 2, 3, and 4 are arranged to have varying degrees of elasticity, the innermost layer which has the smallest arc, and consequently the smallest area, being of the greatest elasticity, the elasticity of each succeeding layer decreasing, so that the several layers will stretch uniformly even though they are of different areas. I accomplish this difference in the elasticity of the several layers by varying the angle of the crossing of the plies of thread forming the layers—that is to say, the plies of thread forming the first or innermost layer would be arranged to cross each other at, say, an angle of forty-five degrees, while those of each succeeding layer would cross at an increasing angle. Layers of rubber 5 are arranged between the several layers of thread and also upon the outer portion of the cover, as in the ordinary construction.

As hereinbefore stated, the construction shown and described might also be utilized in the construction of a single-tube tire of the pneumatic type or in the construction of hose, or any yielding or flexible tubular body designed to withstand internal pressure, and hence I do not limit my invention to the structure shown and described in the present application.

Having thus fully described my invention, what I claim as new, and desire to secure by Letters Patent of the United States, is—

1. A tire-cover comprising a plurality of layers of thread, said layers being of varying degrees of elasticity and arranged with the layer of maximum elasticity innermost and each succeeding layer of less elasticity than its predecessor.

2. A tire-cover comprising a plurality of layers of thread, each layer comprising two plies of thread arranged one upon the other, the threads of the upper ply crossing the lower ply at an angle and the angle of crossing of said plies of thread varying in the different layers to produce layers of varying elasticity, the layer of maximum elasticity being innermost and each succeeding layer decreasing in elasticity.

3. A tire-cover comprising a plurality of alternating layers of rubber and thread, said layers of thread being of varying degrees of elasticity and arranged with the layer of maximum elasticity innermost and each succeeding layer of less elasticity than its predecessor.

4. A tire element comprising a plurality of alterating layers of rubber and thread, said layers of thread being of varying degrees of elasticity and arranged with the layer of maximum elasticity innermost and each succeeding layer of less elasticity than its predecessor.

5. A yielding tubular body designed to withstand internal pressure comprising a plurality of layers of thread, said layers being of varying degrees of elasticity and arranged with the layer of maximum elasticity innermost and each succeeding layer of less elasticity than its predecessor.

6. A yielding tubular body comprising rubber and layers of thread each layer comprising two plies of thread arranged upon the other, the threads of the upper ply crossing those of the lower ply at an angle and the angle of crossing of said plies varying in the different layers to produce layers of varying elasticity, the layer of maximum elasticity being innermost and each succeeding layer decreasing in elasticity.

In testimony whereof I have hereunto attached my signature in the presence of two witnesses.

ARTHUR H. MARKS.

Witnesses:
O. S. HART,
H. A. MacKUSICK.